US006481270B1

(12) United States Patent
Kobayashi et al.

(10) Patent No.: US 6,481,270 B1
(45) Date of Patent: Nov. 19, 2002

(54) CONSTRUCTION FOR A CAM ROTATION SENSOR ATTACHING PORTION

(75) Inventors: Toshiki Kobayashi, Saitama (JP); Takashi Ihara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/651,312

(22) Filed: Aug. 31, 2000

(30) Foreign Application Priority Data

Sep. 3, 1999 (JP) .......................................... 11-250532

(51) Int. Cl.[7] .............................................. G01M 15/00
(52) U.S. Cl. ........................................................ 73/116
(58) Field of Search ................................ 73/116, 117.2, 73/117.3, 118.1; 340/438

(56) References Cited

U.S. PATENT DOCUMENTS

| | | | | |
|---|---|---|---|---|
| 4,883,027 A | * 11/1989 | Oikawa et al. | .......... | 123/90.16 |
| 5,627,464 A | 5/1997 | Shinjo et al. | ............ | 324/207.2 |
| 6,230,675 B1 | * 5/2001 | Kobayashi et al. | ...... | 123/90.15 |
| 6,277,045 B1 | * 8/2001 | Waters Scheuer et al. | .. | 474/152 |
| 6,343,580 B2 | * 2/2002 | Uchida | .................... | 123/90.17 |

FOREIGN PATENT DOCUMENTS

| | | |
|---|---|---|
| EP | 0 802 323 A2 | 10/1997 |
| JP | 04-287841 | 10/1992 |
| JP | 10-176506 | 6/1998 |
| JP | 11-201011 | 7/1999 |
| JP | 11-257124 | 9/1999 |
| JP | 11-311111 | 11/1999 |

* cited by examiner

*Primary Examiner*—Eric S. McCall
(74) *Attorney, Agent, or Firm*—Armstrong, Westerman & Hattori, LLP

(57) ABSTRACT

There is provided a construction for a cam rotation sensor attaching portion where a cam rotation sensor is attached which detect the rotation angles of camshafts (1, 3) supported on cam holders (lower cam holder 12, upper cam holder 13), the construction being characterized in that portions to be detected (projections 18) are provided on thrust plates (17) fixed to axial ends of the camshafts so as to be brought into abutment with an axial end face (a thrust receiving face 31) of the cam holder for regulating axial positions of the camshafts, and that a sensor (a proximity sensor 23) for detecting the passage of the portions to be detected from an axial direction of the camshafts is attached to a member (a sensor attaching wall 20) which is integrated into the cam holder. According to this construction, since the relative positioning accuracy between the portions to be detected and the sensor attaching portion with respect to the axial direction of the camshafts can easily be improved, a high detection accuracy can be obtained. Moreover, since the sensor and the head cover can be attached to and detached from the cylinder head without affecting each other, the maintenance and servicing properties thereof can be enhanced.

20 Claims, 6 Drawing Sheets

CONSTRUCTION FOR A CAM ROTATION SENSOR ATTACHING PORTION

BACKGROUND OF THE INVENTION

1. Field of the Invention

The present invention relates to a construction for a cam rotation sensor attaching portion where a cam rotation sensor is attached which detects rotation angles of camshafts supported on cam holders.

2. Description of the Related Art

A fuel injection engine is provided with a sensor for detecting the rotation angle or angles of a camshaft or camshafts for synchronizing the operation timings of injection valves with the rotation angles of the camshaft or camshafts. Japanese Patent Unexamined Publication No. Hei. 4-287841(JP-A-4-287841) discloses a construction in which a cam rotation sensor is attached to a cylinder head cover.

According to the above conventional construction, however, the cylinder head cover is connected to a cylinder head via a seal member comprising a soft rubber material or the like which is interposed between the head cover and the cylinder head, and therefore, the sensor is liable to be affected by vibrations of the engine. Additionally, no high assembling accuracy is required for assembling the head cover to the cylinder head, and therefore, when attempting at improving the positioning accuracy of the sensor relative to the camshaft or camshafts, this leads to another drawback that an extra cost has to be involved.

SUMMARY OF THE INVENTION

The invention was made with a view to solving the problems inherent in the prior art, and a primary object thereof is to provide a construction for a camshaft rotation sensor attaching portion which can facilitate the improvement in positional accuracy relative to camshafts.

DETAILED DESCRIPTION OF THE PREFERED EMBODIMENT

Figure 1:
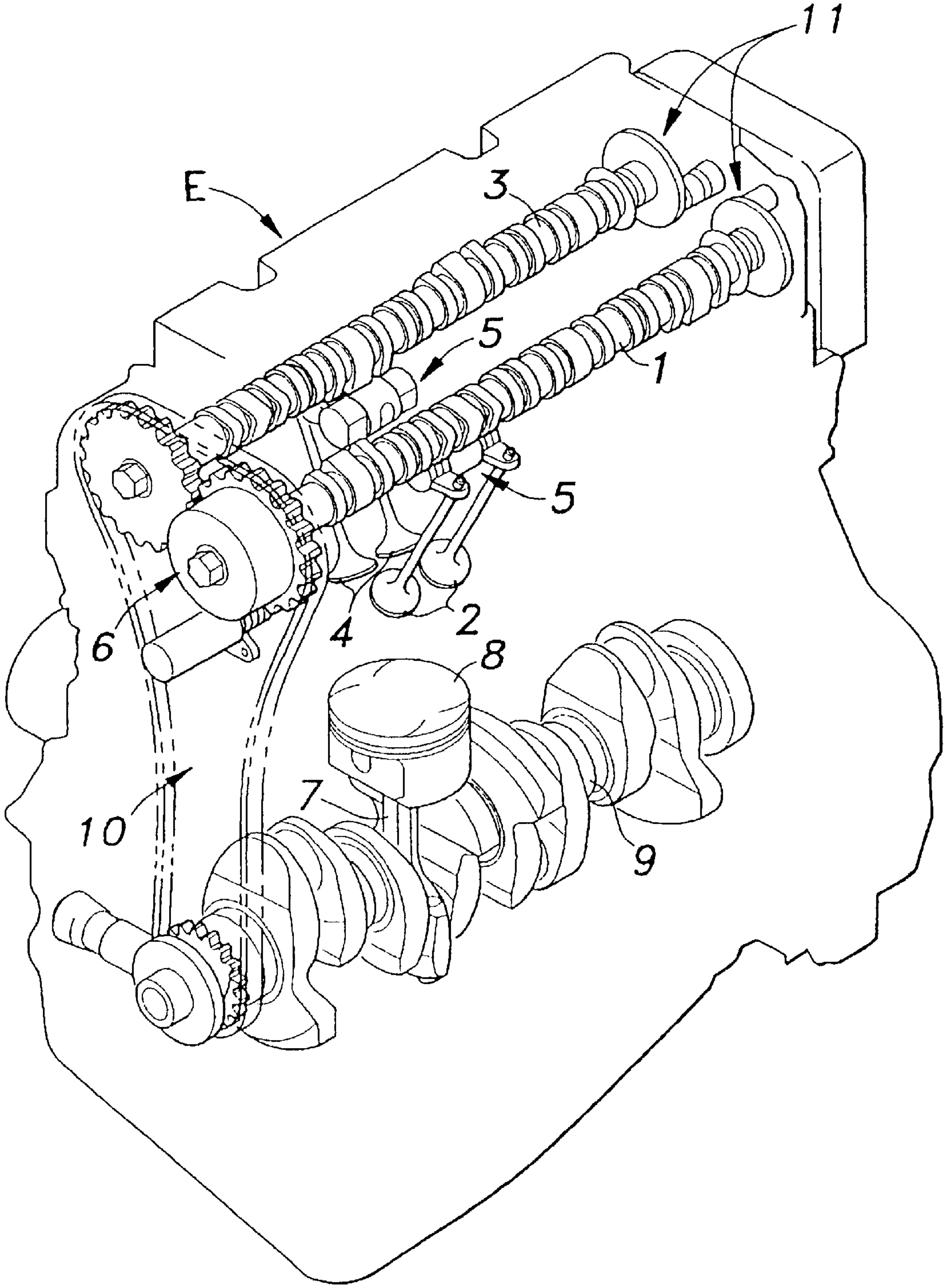
FIG. 1 is a schematic see-through perspective view of an engine to which the invention is applied.

With a view to attaining the above object, according to an aspect of the invention, there is provide a construction for a cam rotation sensor attaching portion where a cam rotation sensor is attached which detects the rotation angles of camshafts (1, 3) supported on cam holders (lower cam holder 12, upper cam holder 13), in the construction of the present invention, portions to be detected (projections 18) are provided on thrust plates (17) fixed to axial ends of the camshafts so as to be brought into abutment with an axial end face (a thrust receiving face 31) of the cam holder for regulating axial positions of the camshafts, and that a sensor (a proximity sensor 23) for detecting the passage of the portions to be detected from an axial direction of the camshafts is attached to a member (a sensor attaching wall 20) which is integrated into the cam holder. According to this construction, since the relative positioning accuracy between the portions to be detected and the sensor attaching portion with respect to the axial direction of the camshafts can easily be improved, a high detection accuracy can be obtained. Moreover, since the sensor and the head cover can be attached to and detached from the cylinder head without affecting each other, the maintenance and servicing properties thereof can be enhanced.

When sensor is attached to cam holder at upper side, cumulative errors tend to be increased while assembling steps and measurements at upper side tend to be increased, therefore the head cover become larger. On the other hand, when the axial end face to which said sensor is attached are provided below the center of said camshafts, it is possible to overcome such an inconvenience.

Referring to the accompanying drawings, the invention will be described in detail below.

FIG. 1 shows an inline four-cylinder DOHC engine to which the invention is applied. Provided for each of the four cylinders on a cylinder head of this engine E are two intake valves driven by an intake camshaft 1 and two exhaust valves 4 driven by an exhaust camshaft 3. A first valve operation characteristics changing device 5 or a first variable valve timing and lift device for changing in two steps the valve lift and opening angle of the respective valves 2, 4 in reply to the rotation speed of the camshafts is provided between the intake camshaft 1 and the intake valve 2 and between the exhaust camshaft 3 and the exhaust valve 4, respectively. Additionally, a second valve operation characteristics changing device 6 or a second variable valve timing and lift device for advancing or retarding the opening and closing timings of the intake valves 2 in a stepless fashion is provided at an axial end of the intake camshaft 1.

These intake camshaft 1 and exhaust camshaft 3 are interlockingly connected via a chain/sprocket mechanism 10 to a crankshaft 9 to which four pistons 8 are connected via connecting rods 7 and are driven to rotate at a rotating speed of one half the rotating speed of the crankshaft 9.

Camshaft rotation detecting devices 11 for detecting the rotation angles of the two camshafts 1, 3 individually are provided at axial ends of those camshafts 1, 3 which are opposite to other axial ends thereof where the chain/sprocket mechanism 10 is provided. Additionally, these camshaft rotation detecting devices 11 and the second valve operation characteristics changing device 6 are provided at the opposite axial ends of the camshafts, respectively. Thus, since the camshaft rotation detecting devices 11 are provided at the opposite end of the camshafts to the chain/sprocket mechanism 10 and the second valve characteristics changing device 6 is provided at the opposite end of the camshafts to those camshaft rotation detecting devices 11, a high space utilizing efficiency can be obtained.

Figure 2:
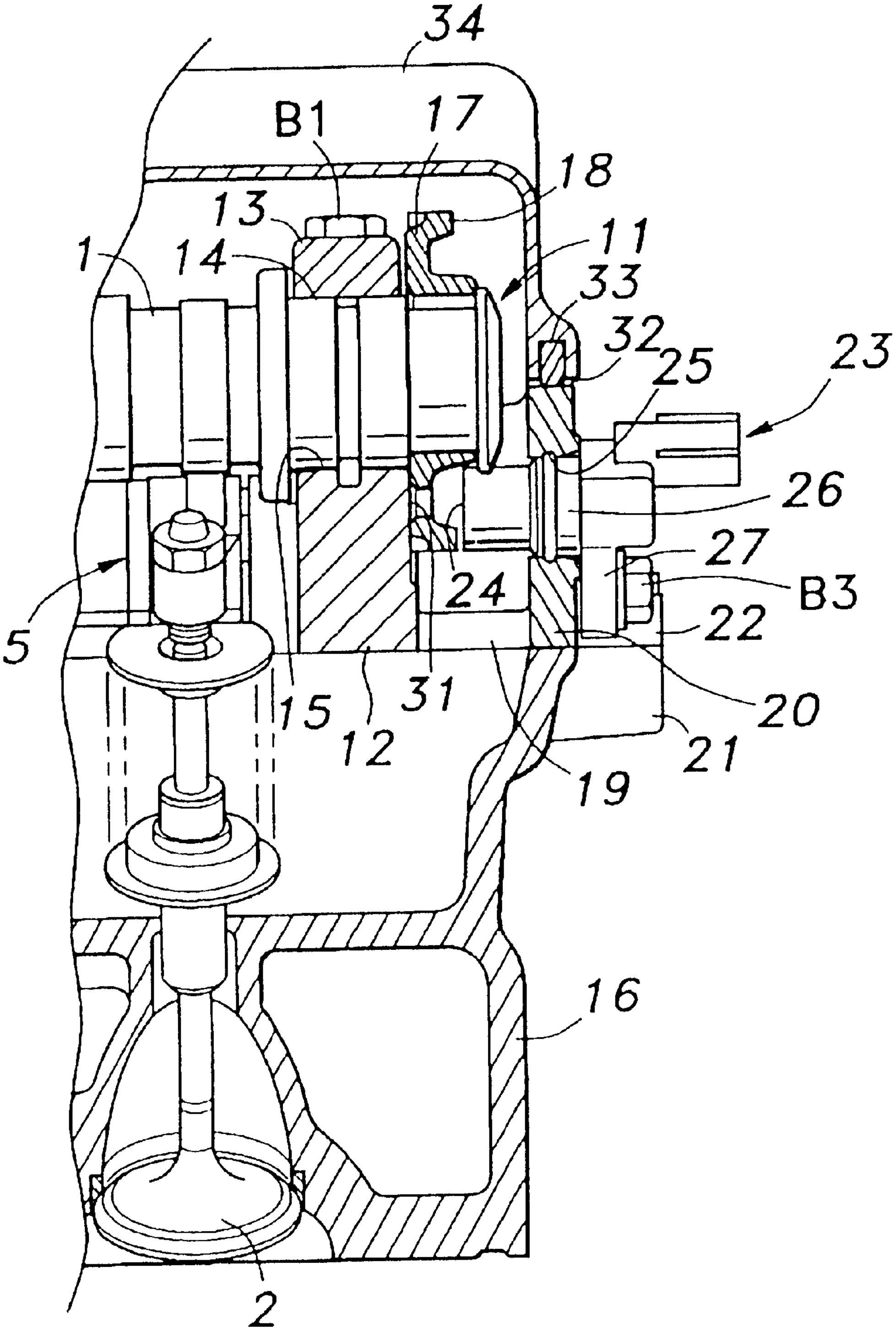
FIG. 2 is a vertical sectional view showing a main part of the invention.
Figure 3:
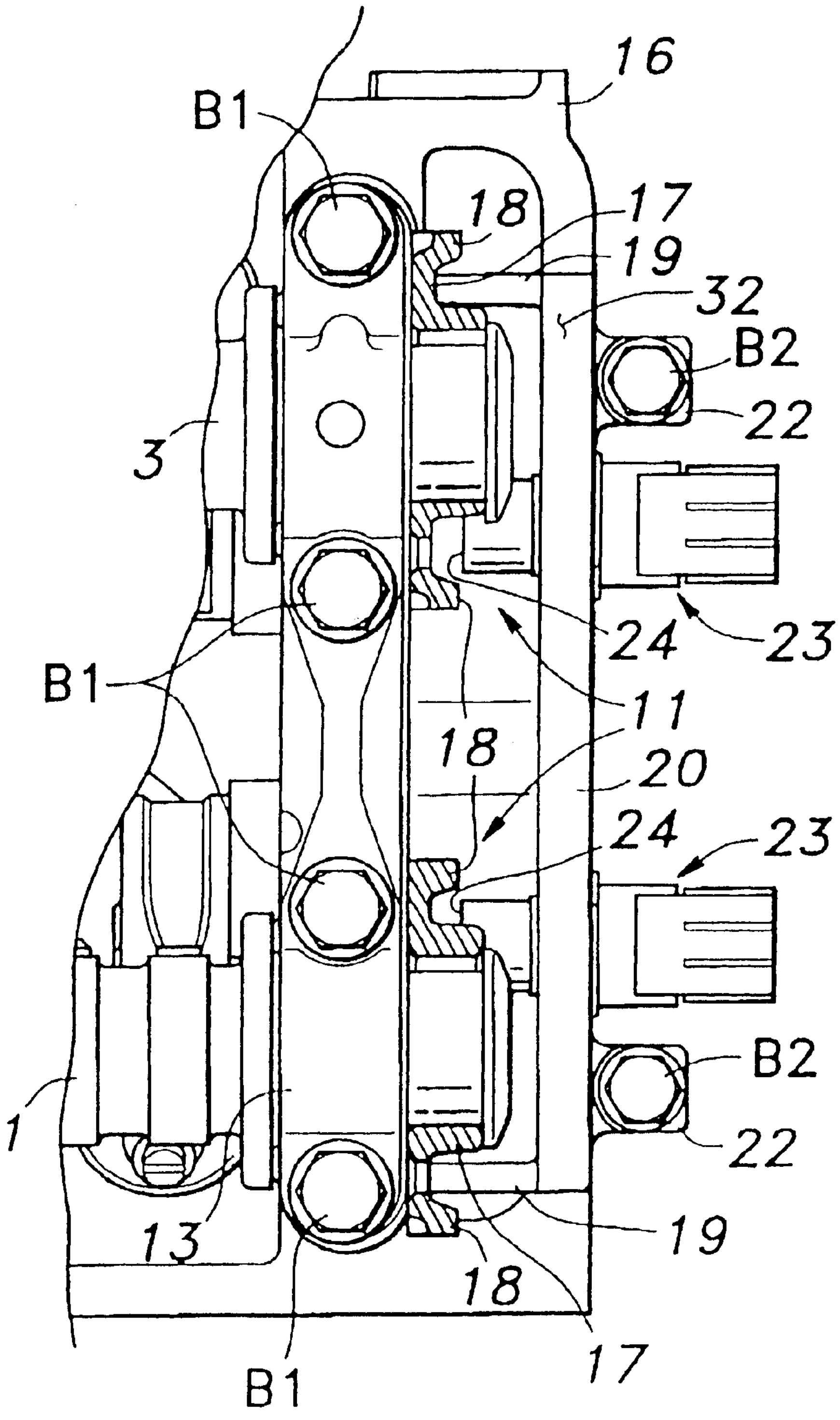
FIG. 3 is a top view showing the main part of the invention with a head cover being removed.
Figure 4:
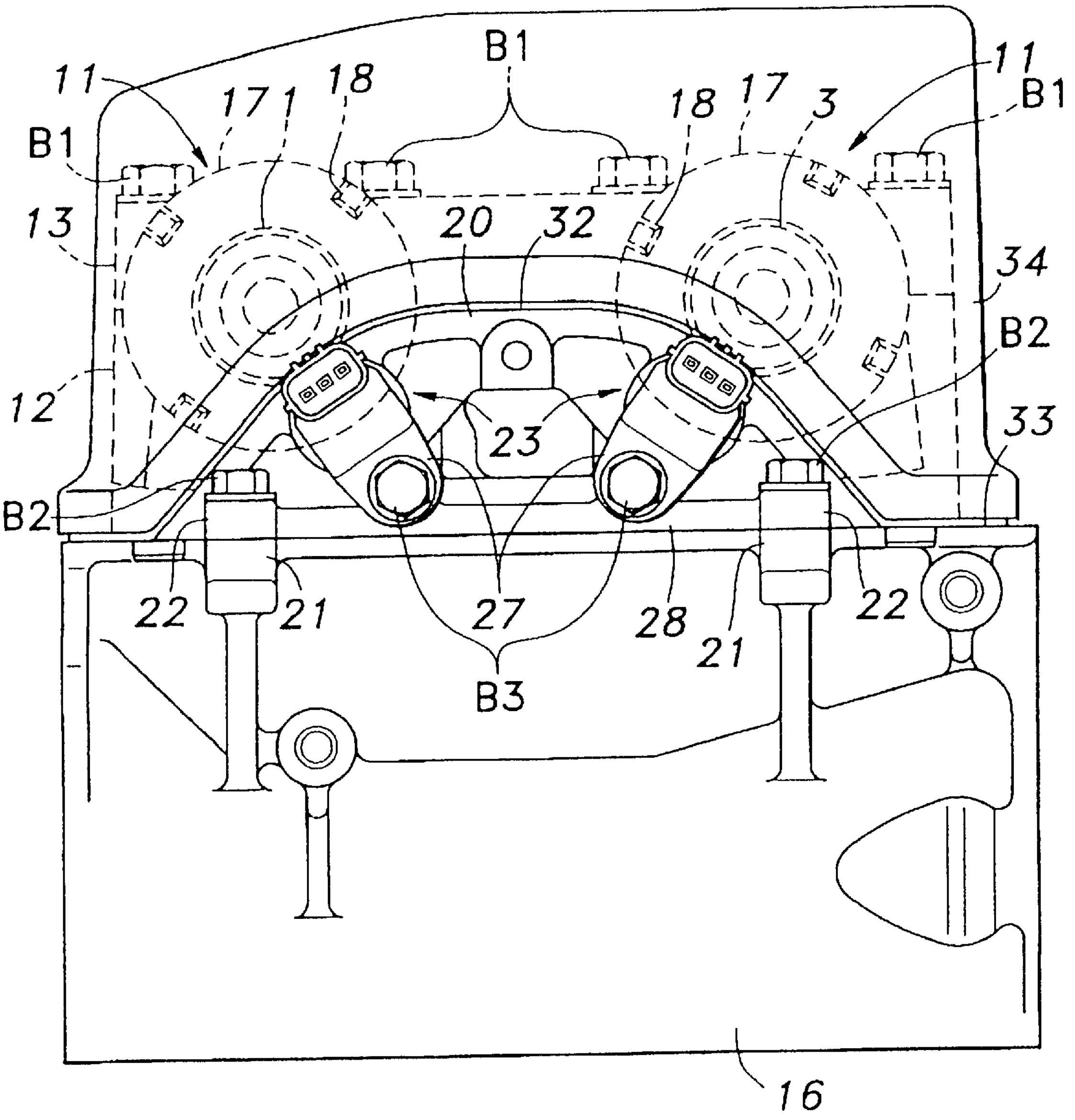
FIG. 4 is an elevational view showing the main part of the invention.

As shown in FIGS. 2 to 4, the two camshafts 1, 3 are supported by lower cam holders 12 and upper cam holders 13 which are each vertically divided at a plane which passes through the axial centers of the respective camshafts. Therefore, bearing holes 15 for supporting journal portions 14 of the two camshafts 1, 3 are also divided into two halves, respectively.

The lower cam holders 12 are joined to an upper surface of the cylinder head 16, and the upper cam holders 13 are joined to upper surfaces of the lower cam holders 12, these cam holders 12, 13 being secured to the cylinder head 16 with four through bolts B1.

Thrust plates 17 are integrally connected to the axial ends of the two camshafts 1, 3, respectively. These thrust plates 17 are formed into a disc-like shape and are brought into sliding contact with an axial end face of the lower cam holder 12 which is located at a most outboard position or remotest position of the respect camshafts from the chain/sprocket mechanism 10 which is located below the center of the camshafts, whereby the axial movement of the respective camshafts 1, 3 toward the chain/sprocket mechanism 10 is regulated. In addition, a plurality of projections 18 which axially project are formed on a peripheral portion of each of the thrust plates 17 for generating pulse signals to an electromagnet-type proximity sensor, which will be described later (in this embodiment, four projections are formed on the peripheral portion of each thrust plate at intervals of 90 degrees).

An extended portion 19 is formed on a lowest portion of the lower cam holder 12 that is to be joined to the cylinder head 16 in such a manner as to extend in a direction opposite to the chain/sprocket mechanism. Then, a sensor attaching wall 20 rising vertically is connected to an end of the extended portion 19 which is opposite to the chain/sprocket mechanism. In other words, the lower cam holder 12 and the sensor attaching wall 20 are formed integrally.

Lug pieces 22 are provided so as to project axially from a lowest portion of the sensor attaching wall 20 which is joined to the cylinder head 16 in such a manner as to correspond to bosses 21 provided so as to project from an end face of the cylinder head 16 which is opposite to a pulley end thereof. The sensor attaching wall 20 which is integral with the lower cam holder 12 is integrally connected to the cylinder head by securely screwing bolts B2 extending through these lug pieces 22 into the bosses 20.

A proximity sensor 23 is attached to the sensor attaching wall 20 in such a manner as to correspond to the respective intake and exhaust camshafts. Namely, the proximity sensor 23 is attached below the center of the camshafts. This proximity sensor 23 is attached to such a position that a detecting surface 24 thereof can confront distal ends of the projections 18 on the thrust plates 17, whereby the proximity sensor can catch a magnetic pulse signal generated when the projections 18 pass in front of the detecting surface 24 as the thrust plates 17 rotate, thereby making it possible to detect the rotation angles of the respective camshafts 1, 3.

The proximity sensor 23 is fixed to the sensor attaching wall 20 in such a manner that a coil case portion 26 thereof is fitted in a hole 25 formed in the sensor attaching wall 20 and that bolts B extending through stay portions 27 are securely screwed into the sensor attaching wall 20. Note that the left and right lug pieces 22 for fastening the sensor attaching wall 20 to the cylinder head 16 are connected to each other by a rib 28 passing through the bolt fastened portions of the stay portions 27 of the proximity sensor 23.

Figure 5:
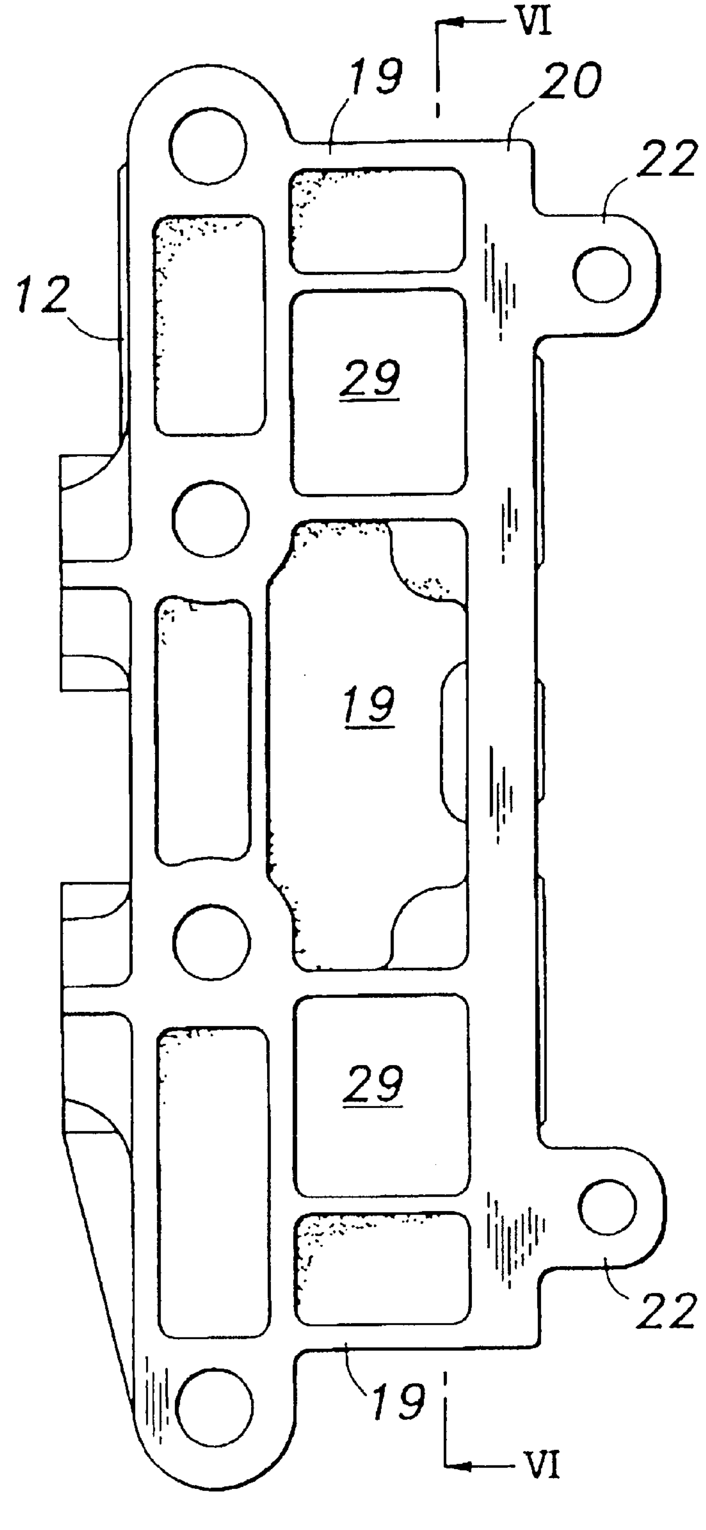
FIG. 5 is a bottom view of a lower cam holder.

As shown in FIG. 5, excess metal of the extended portion 19 for connecting the lower cam holder 12 to the sensor attaching wall 20 is cut away at its joining surface to the cylinder head 16 to reduce the weight of the engine, and openings 29 are also formed in the extended portion 19 in such a manner as to be continuous with oil dropping holes formed in the cylinder head 16. In addition, a triangular hollow closed cross-sectional portion 30 is integrally formed at a central portion of the extended portion 19, whereby weight reduction is compatible with high rigidity at a high level. The extended portion 19 is provided so as to be located where the lug pieces 22 of the sensor attaching wall 20 are provided and where the proximity sensor 23 is attached, whereby the originally intended rigidity can be obtained with the lowest possible weight.

Figure 6:
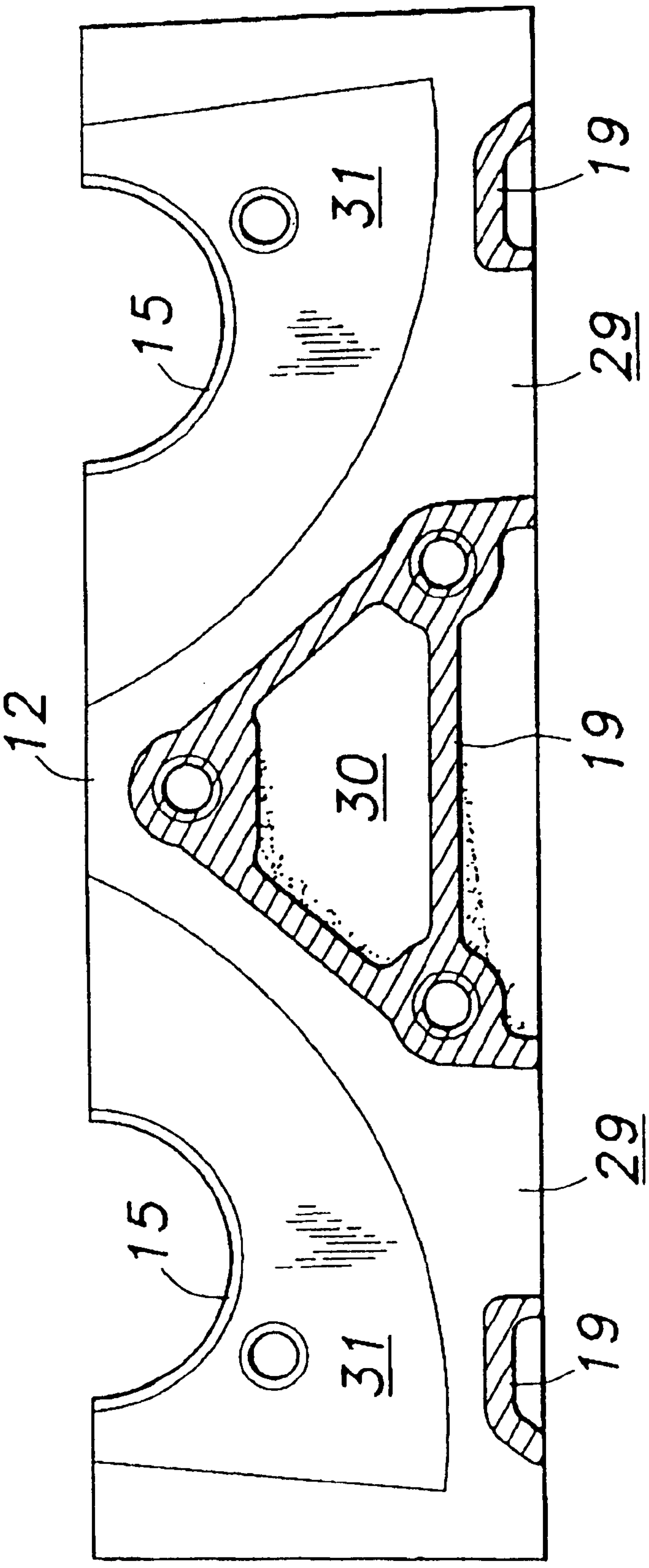
FIG. 6 is a vertical sectional view taken along the line VI—VI of FIG. 5.

As shown in FIG. 6, smoothly cut thrust receiving surfaces 31 are formed on the surface of the lower cam holder 12 where the thrust plates 17 are brought into sliding contact.

An upper edge of the sensor attaching wall 20 is formed into a curved surface which is convexed upwardly, and the head cover 34 is placed on the cylinder head 16 with a gasket 33 comprising a rubber material being held between the curved upper edge surface 32 of the sensor attaching wall 20 and portions of the upper surface of the cylinder head 16 which protrude from both sides of the sensor attaching wall 20 and the head cover in order to improve seal-off properties.

Thus, according to the invention, since the projections are provided on the thrust plates which are fixed to the axial ends of the camshafts so as to be brought into abutment with the thrust receiving surfaces of the cam holder for regulating the axial positions of the camshafts and since the proximity sensor for detecting the passage of the projections in the axial direction of the camshafts is attached to the sensor attaching wall which is integral with the cam holder, the relatively positioning accuracy between the thrust plates and the proximity sensor can easily be enhanced, whereby there is provided an advantage that the detection accuracy and stability can be enhanced considerably. Moreover, since the proximity sensor and the head cover can be attached to and detached from the cylinder head without interfering with each other, the high maintenance and servicing properties can be obtained.

In addition, when an axial end face to which the thrust is brought into abutment with and said portion where the sensor is attached are provided below the center of the camshafts, since cumulative errors are prevented form being increased, and measurements at upper side are also prevented form being increased as compared with the case that the proximity sensor is attached to the side of the upper cam holder, therefore it is possible to prevent the head cover from making large.

What is claimed is:

1. A structure, comprising:

a camshaft;

a plurality of cam holders for supporting the camshaft;

a cam rotation sensor for detecting rotation angles of said camshaft; and a thrust plate being fixed to an axial end of said camshaft, and being brought into abutment with an axial end face of one of said camholders for regulating axial positions of said camshaft, wherein a first plurality of portions to be detected are provided on said thrust plate, said cam rotation sensor opposes to said thrust plate in an axial direction of said camshaft to detect a passage of each of said first plurality of portions from an axial direction of said camshaft, and said cam rotation sensor is directly attached to a member which is integrated into said cam holder.

2. The structure according to claim 1, wherein said axial end face to which said thrust plate is brought into abutment with and said member where said sensor is attached to are provided below an axis of said camshaft.

3. The structure according to claim 1, further comprising:

a cylinder head; and a rib, wherein a second plurality of portions where said member is fastened to said cylinder head are each connected to said rib by a bolt fastened portion.

4. The structure according to claim 1, further comprising:

a cylinder head; and a rib, wherein a fastened portion where said member is fastened to said cylinder head is connected to a bolt fastened portion by said rib.

5. The structure according to claim 1, further comprising:

a cylinder head;

an extended portion for connecting said cam holder to said member;

wherein a surface of said extended portion joining a cylinder head is cut away.

6. The structure according to claim 5, further comprising:

a triangular hollow closed cross-sectional portion;

wherein the triangular hollow closed cross-sectional portion is integrally formed at said extended portion.

7. The structure according to claim 6, wherein said extended portion is provided at a center portion of said cam holder.

8. The structure according to claim 5, wherein said extended portion is provided at a fastened portion where said member is fastened to said cylinder head.

9. The structure according to claim 5, wherein said extended portion is attached to said member.

10. The structure according to claim 1, wherein an upper edge surface of said member is formed into a curved surface which is convexed upwardly.

11. The structure according to claim 10, further comprising:

a gasket;

a cylinder head; and a head cover;

wherein said head cover is provided on said cylinder head with said gasket being held between the curved surface of said member and said head cover.

12. The structure according to claim 1, further comprising:

a head cover;

wherein said sensor is attached to said member from an outside of said member without being connected to said head cover.

13. The structure according to claim 2, further comprising:

a cylinder head; and a rib, wherein a second plurality of portions where said member is fastened to said cylinder head are each connected to said rib by a bolt fastened portion.

14. The structure according to claim 2, further comprising:

a cylinder head; and a rib, wherein a fastened portion where said member is fastened to said cylinder head is connected to a bolt fastened portion.

15. The structure according to claim 2, comprises an extended portion for connecting said cam holder to said member where said sensor is attached to, wherein a surface of said extended portion which joints to a cylinder head is cut away.

16. The structure according to claim 2, wherein an upper edge surface of said member is formed into a curved surface which is convexed upwardly.

17. The structure according to claim 2, further comprising:

a head cover;

wherein said sensor is attached to said member from an outside of said member without being connected to said head cover.

18. The structure according to claim 12, further comprising:

a cylinder head; and a rib, wherein a fastened portion where said member is fastened to said cylinder head is connected to a bolt fastened portion by said rib.

19. The structure according to claim 12, further comprising:

a cylinder head; and an extended portion for connecting said cam holder to said member, wherein a surface of said extended portion joining said cylinder head is cut away.

20. The structure according to claim 19, wherein said extended portion is provided for attaching said sensor.

* * * * *